United States Patent [19]

DeRees et al.

[11] Patent Number: 5,570,922
[45] Date of Patent: Nov. 5, 1996

[54] VEHICLE DOOR ASSEMBLY

[75] Inventors: Delbert D. DeRees, Romeo; David J. Kowall, Hartland, both of Mich.

[73] Assignee: Chrysler Corporation, Highland Park, Mich.

[21] Appl. No.: 470,873

[22] Filed: Jun. 6, 1995

Related U.S. Application Data

[62] Division of Ser. No. 155,367, Nov. 22, 1993, Pat. No. 5,505,024.

[51] Int. Cl.[6] .................................................. B60J 5/04
[52] U.S. Cl. ........................ 296/146.6; 296/146.9; 296/188
[58] Field of Search .............................. 296/146.6, 188, 296/146.9; 49/502, 503

[56] References Cited

U.S. PATENT DOCUMENTS

| | | | |
|---|---|---|---|
| 3,776,588 | 12/1973 | Sobajima et al. | 296/146 |
| 3,788,686 | 1/1974 | Rossie et al. | 296/146.6 |
| 3,819,228 | 6/1974 | Cornacchia | 296/146.9 |
| 3,829,149 | 8/1974 | Stevens | 296/28 R |
| 4,013,317 | 3/1977 | Reidelbach et al. | 296/146.6 |
| 4,090,734 | 5/1978 | Inami et al. | 296/146 |
| 4,222,603 | 9/1980 | Breitschwerdt et al. | 296/146.9 |
| 4,277,099 | 7/1981 | Klein et al. | 296/146.9 |
| 4,307,911 | 12/1981 | Pavlik | 296/146.6 X |
| 4,434,580 | 3/1984 | Engelsberger et al. | 49/502 |
| 4,438,969 | 3/1984 | Kamijo et al. | 296/188 X |
| 4,462,633 | 7/1984 | Maeda | 296/188 |
| 4,488,751 | 12/1984 | Kling | 296/188 X |
| 4,651,470 | 3/1987 | Imura et al. | 49/502 |
| 4,711,052 | 12/1987 | Maeda et al. | 49/502 |
| 4,716,682 | 1/1988 | DeRees | 49/352 |
| 4,831,710 | 5/1989 | Katoh et al. | 29/434 |
| 4,843,762 | 7/1989 | Grier et al. | 49/378 |
| 4,860,496 | 8/1989 | Hellriegel | 49/502 |
| 4,866,883 | 9/1989 | Brown et al. | 49/502 |
| 4,892,348 | 1/1990 | Nozaki | 296/146.9 |
| 4,915,442 | 4/1990 | Garnweidner | 296/146.6 X |
| 4,917,433 | 4/1990 | Tomforde | 296/146.6 X |
| 4,924,630 | 5/1990 | Lomasney et al. | 49/502 |
| 5,029,934 | 7/1991 | Schrader et al. | 296/188 X |
| 5,094,034 | 3/1992 | Freeman | 49/501 |
| 5,137,325 | 8/1992 | Ohya | 296/146.6 X |
| 5,306,067 | 4/1994 | Hull et al. | 296/146.6 |
| 5,308,138 | 5/1994 | Hlavaty | 49/502 X |
| 5,322,338 | 6/1994 | Hirakami | 296/188 X |
| 5,395,153 | 3/1995 | De Smet | 296/146.6 |

Primary Examiner—Joseph D. Pape
Attorney, Agent, or Firm—Thomas G. Pasternak

[57] ABSTRACT

A vehicle door assembly including an outer contoured panel, an inner contoured panel, the panels being connected at their side and bottom edges, and a glass and regulator track assembly adapted to being assembled through the adjacent upper edges of the panels into the space between the panals and secured to the inner panel. A majority of the inner trim is molded integrally as the surface of the inner panel, with a separately applied trim element secured to the upper edge portion of the inner panel, and an arm rest secured to the inner panel at a central portion thereof. A side impact beam extends longitudinally between the outer and inner panels, and includes a longitudinally oriented mounting plate at its forward end and a laterally oriented mounting plate at its rear end for mounting on the inner panel.

2 Claims, 13 Drawing Sheets

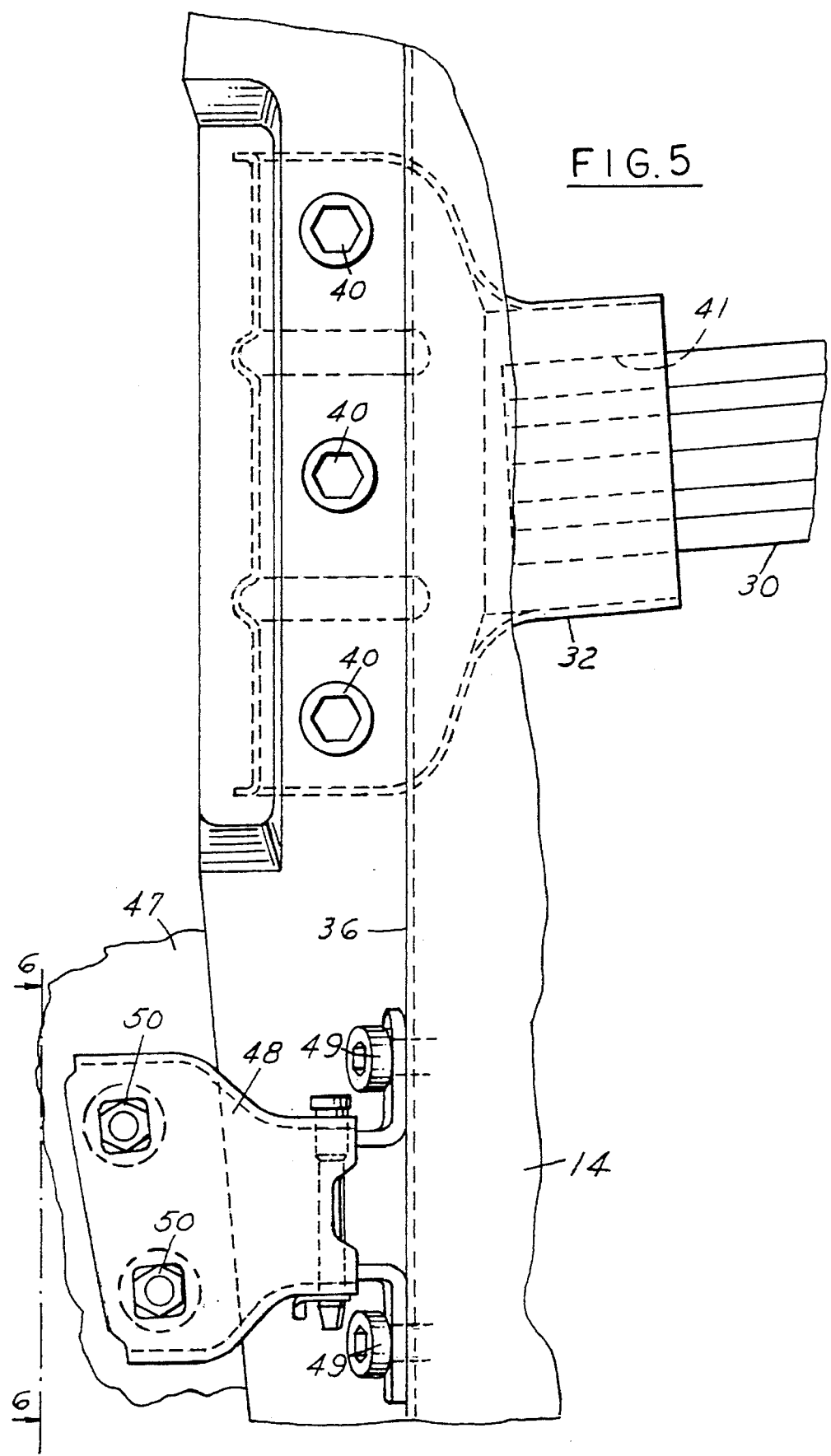

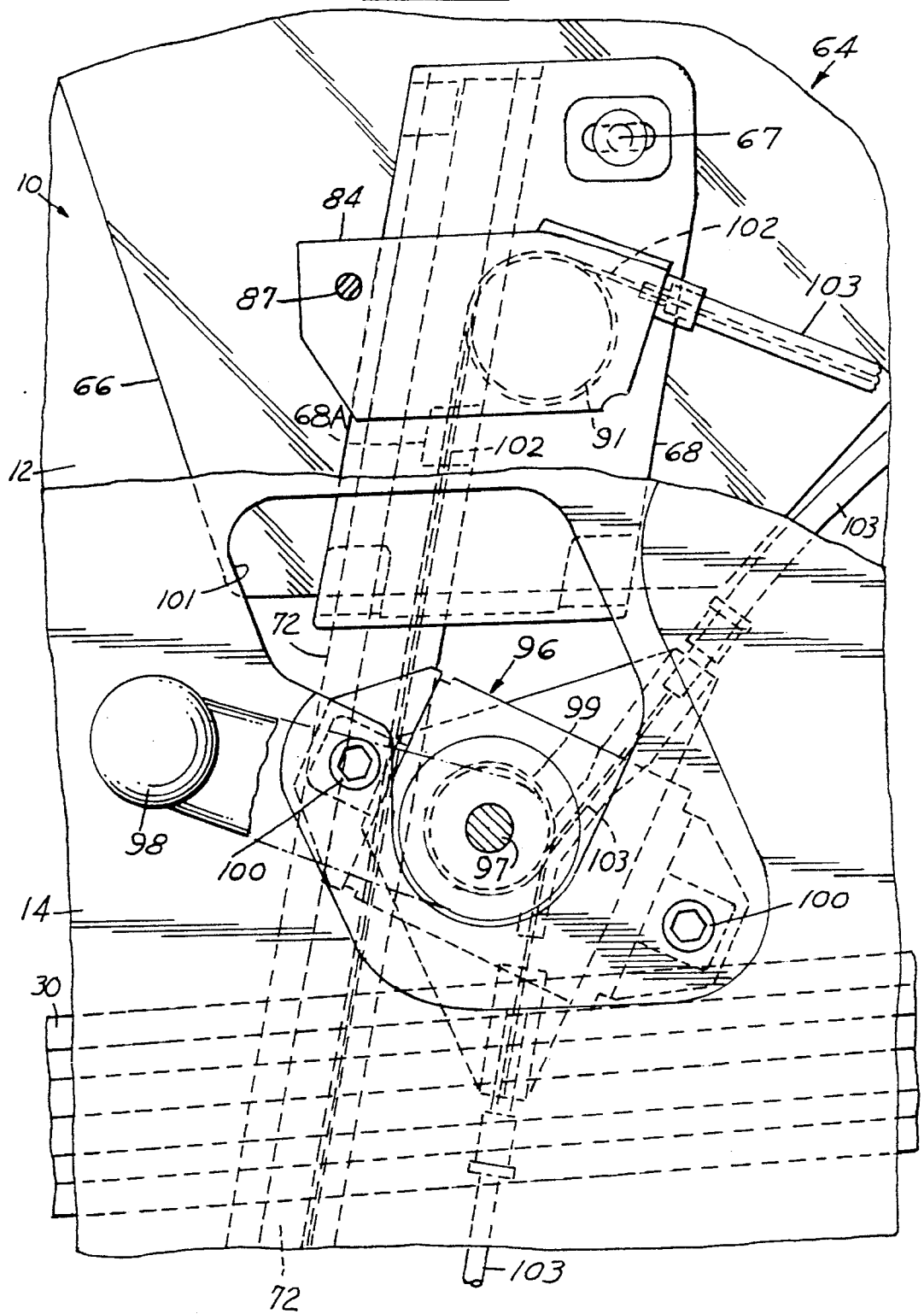

5,570,922

VEHICLE DOOR ASSEMBLY

This is a division of application Ser. No. 08/155,367, filed on Nov. 22, 1993, now U.S. Pat. No. 5,505,024.

TECHNICAL FIELD

This invention relates generally to vehicle door assemblies and, more particularly, to such assemblies which are light in weight, low in cost, and readily assembled and serviced.

BACKGROUND ART

Heretofore, vehicle door assemblies have conventionally included full outer and inner panels, and full interior trim panels, wherein assembly of the interior components is accomplished prior to assembly of the inner door trim panel, and access to the interior components for repair requires removal of the full interior trim panel.

De Rees U.S. Pat. No. 4,716,682 discloses a modular door structure having upper and lower housing portions which are detachable from each other, and wherein the upper housing portion carries a retractable window panel.

Various reinforcement members for vehicle doors are shown in the following patents:

Stevens U.S. Pat. No. 3,839,149; Inami et al U.S. Pat. No. 4,090,734; Engelsberger U.S. Pat. No. 4,434,580; Imura et al U.S. Pat. No. 4,651,470; Hellriegel U.S. Pat. No. 4,860,496; Lomasney et al U.S. Pat. No. 4,924,630; and Freeman U.S. Pat. No. 5,094,034.

Sobajima et al U.S. Pat. No. 3,776,588 discloses a vehicle door and body arrangement having upper and lower coactive engaging means, each including a peripheral crest and corresponding peripheral groove engageable with each other.

DISCLOSURE OF THE INVENTION

A general object of the invention is to provide an improved vehicle door assembly;

Another object of the invention is to provide an improved door assembly, preferably for a door construction without an upper structural frame;

A further object of the invention is to provide a door assembly including an outer contoured panel and an inner contoured panel connected at their front and rear sides and bottom edges, and wherein hardware is loaded from outside the door; a glass and regulator assembly is loaded through the belt opening; access to the latch, outside handle, key cylinder, and linkage is through a latch cover mounted on the inner panel; and access to the mirror assembly, inside handle, and regulator mounting is through the belt-line trim panel; the end result being reduced weight and cost, and less time required for assembly and service.

Still another object of the invention is to provide a vehicle door assembly wherein a major portion of the door trim is molded into the inner panel surface, with only a small added portion of trim, including an arm rest, being required.

These and other objects and advantages will become apparent when reference is made to the following drawings and the accompanying description.

BRIEF DESCRIPTION OF THE DRAWINGS

FIGS. 5, 7, 8, 10, 11, 12, 13 and 16 are enlarged fragmentary views of portions of FIG. 1;

BEST MODE OF CARRYING OUT THE INVENTION

Figure 1:
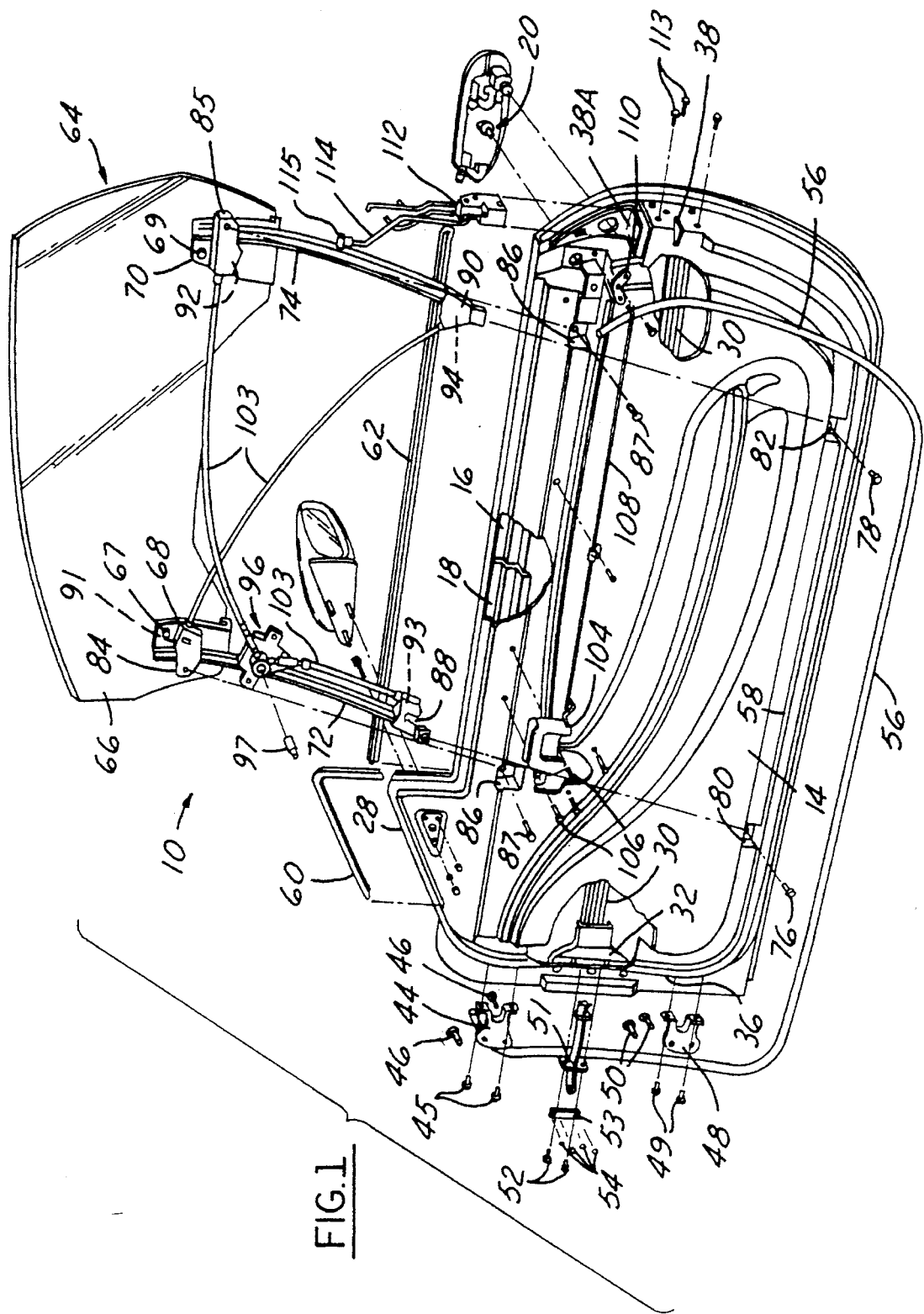
FIG. 1 is an exploded perspective view of the inventive door assembly, less the interior trim.
Figure 2:
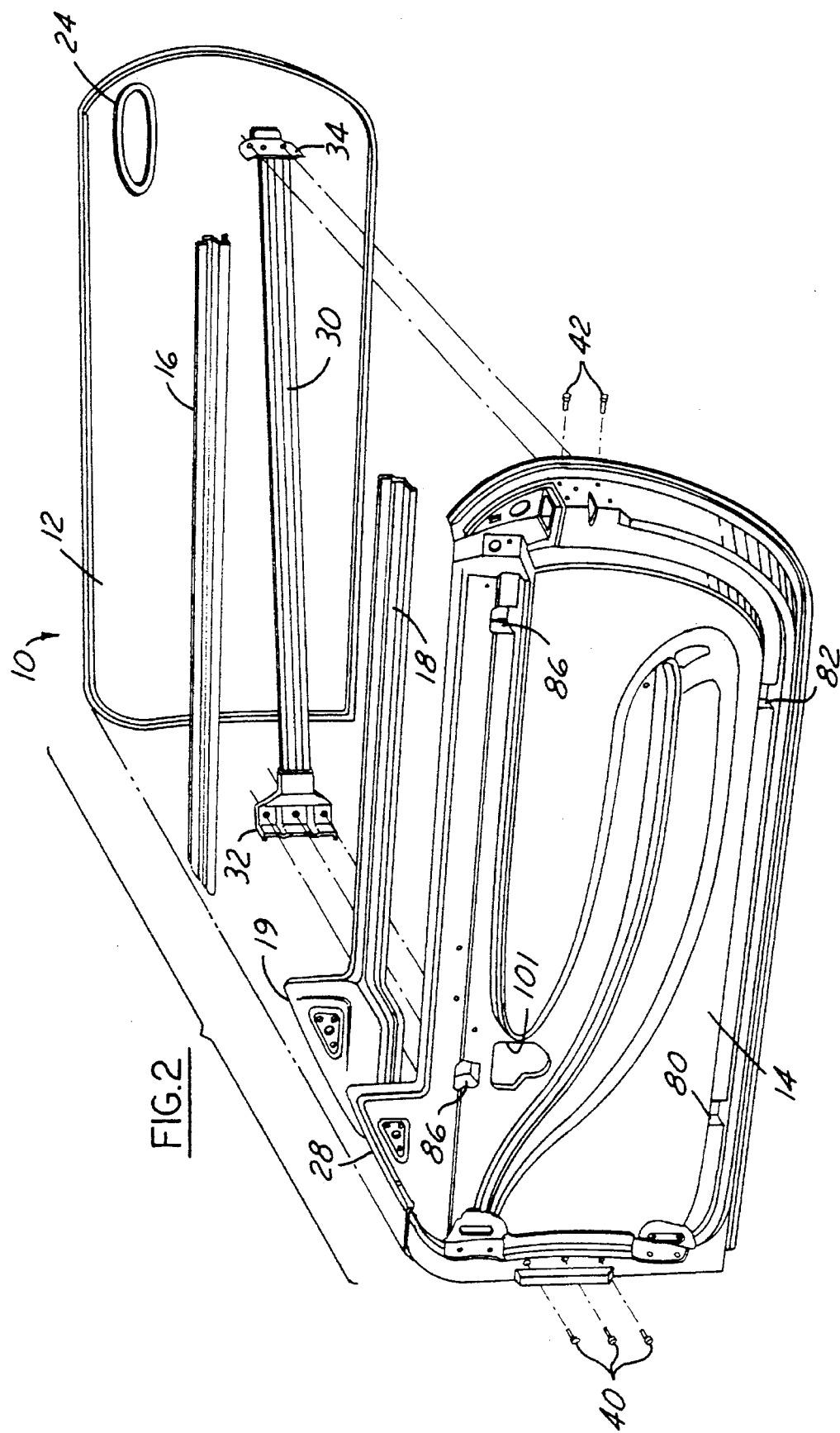
FIG. 2 is an exploded perspective view of components of the inventive door assembly.

Referring now to the drawings in greater detail, FIGS. 1 and 2 illustrate a door assembly 10 including a composite contoured outer panel 12 and a composite contoured inner panel 14 adapted to being interconnected at their outer peripheral sides and bottom edges. In between the upper peripheral edges are mating composite outer door and belt reinforcement and composite inner door and belt reinforcement members 16 and 18, respectively. The member 18 includes an upwardly extending portion 19.

An outside door handle and key cylinder assembly 20 is (FIG. 1) adapted to be mounted on a rear open portion 24 (FIG. 2) of the outer panel 12. An outside mirror assembly 26 is secured to the upwardly extending portion 19 and to a front upwardly extended portion 28 of the inner door and belt reinforcement member 18.

Figure 9:
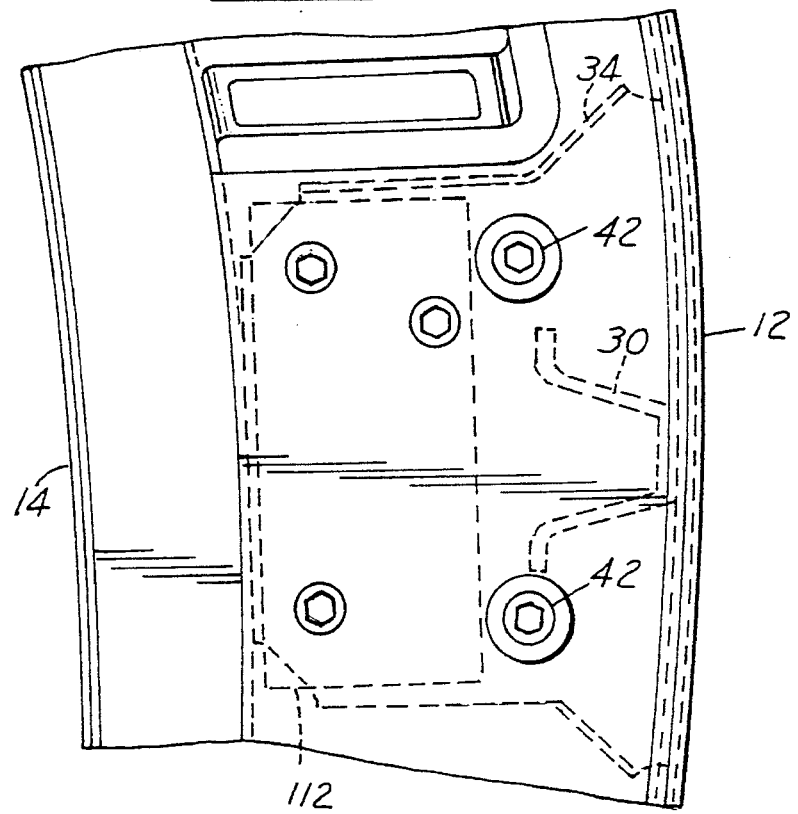
FIG. 9 is an enlarged end view taken along the plane of the line 9—9 of FIG. 3, and looking in the direction of the arrows.

A structural impact beam 30 (FIG. 2) extends longitudinally between the outer and inner panels 12 and 14, and includes a front longitudinally oriented mounting plate 32 (FIGS. 2 and 5) and a rear laterally oriented mounting plate 34 (FIG. 2) for mounting respectively on a front end wall 36 and a rear end wall 38 of the contoured inner panel 14, being secured thereto by suitable fasteners 40 (FIG. 5) and 42 (FIG. 9), respectively. The perpendicular relationship of the beam 30 opposite end fastening technique serves to add rigidity to the side impact structure.

An upper door hinge assembly 44 is secured by fasteners 45 to the upper portion of the front end wall 36, and by fasteners 46 to a front vehicle pillar, represented at 47 (FIG. 5). A lower door hinge assembly 48 (FIGS. 1, 5 and 6) is secured by fasteners 49 to the lower portion of the front end wall 36, and by fasteners 50 (FIG. 5) to the front vehicle pillar 47. A check strap assembly 51 (FIGS. 1 and 7) is secured by fasteners 52 to a bracket 53, which is attached to the intermediate portion of the front end wall 36 by fasteners 54.

A long seal strip 56 (FIG. 1) mounts around the edge of the front end wall 36, a bottom surface 58, and the rear end wall 38. A short seal strip 60 mounts around the edge of the front upwardly extended portion 28 of the inner door and belt reinforcement member 19. A glass and belt outer seal assembly 62 extends across the upper edge of the outer door panel 12.

Figure 11:
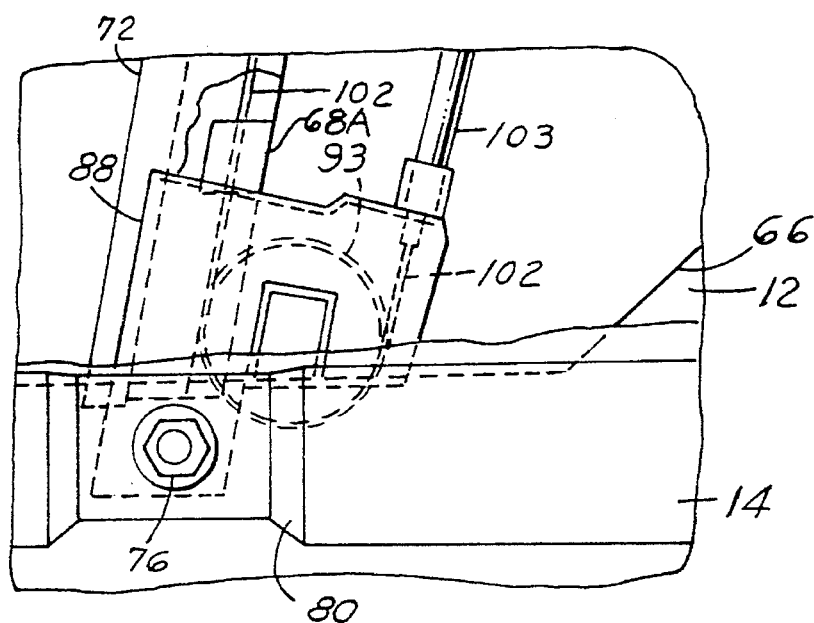
Figure 12:
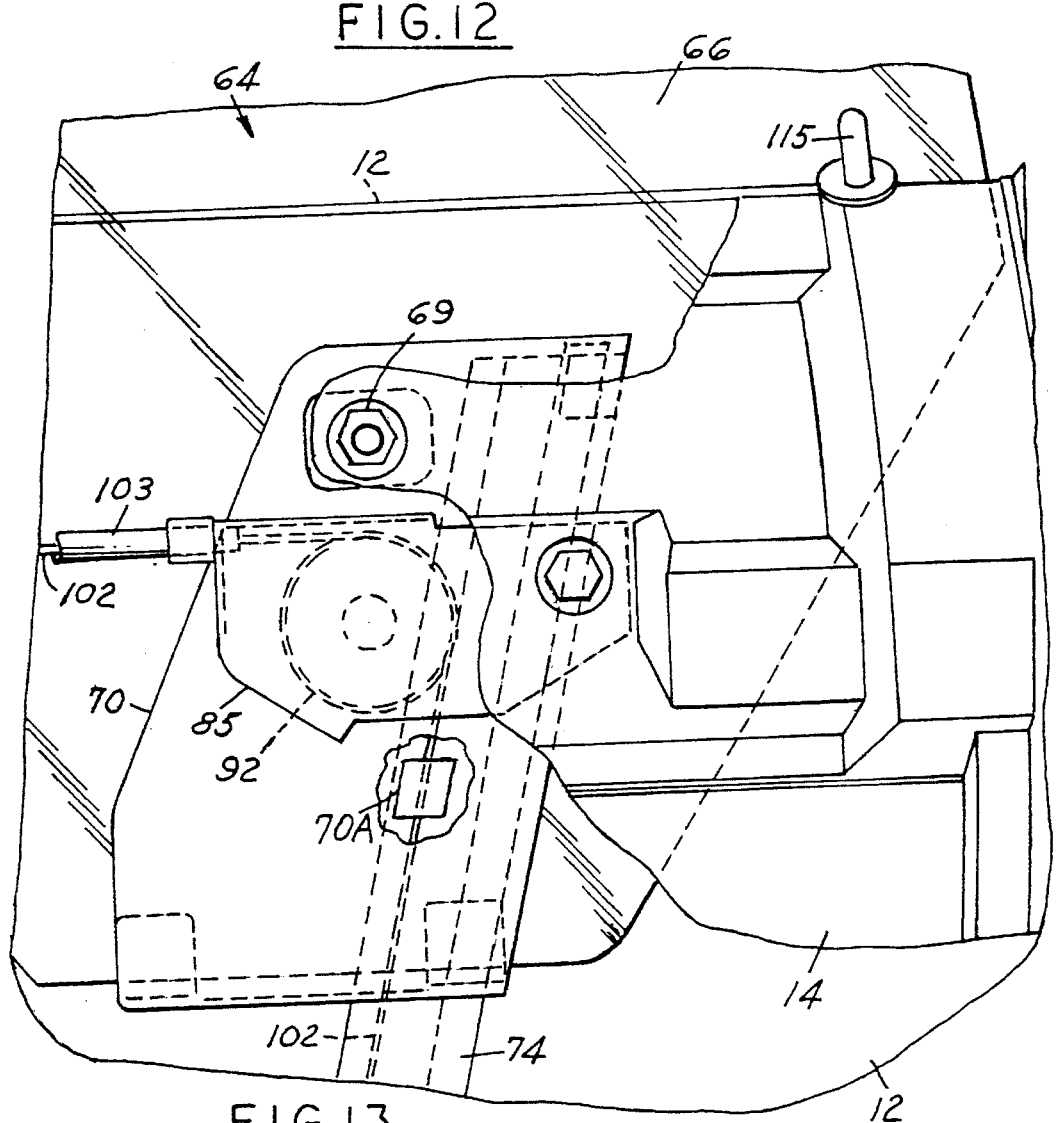
Figure 13:
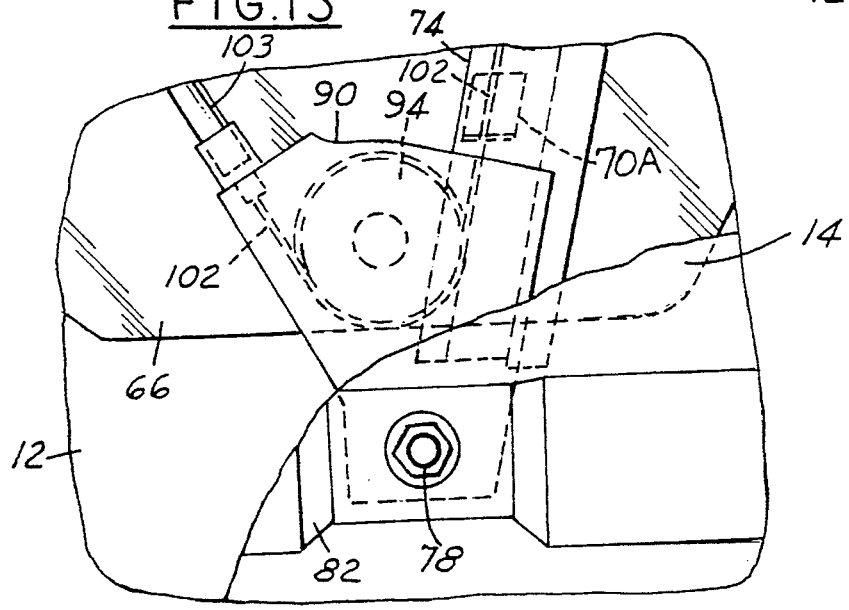
Figure 14:
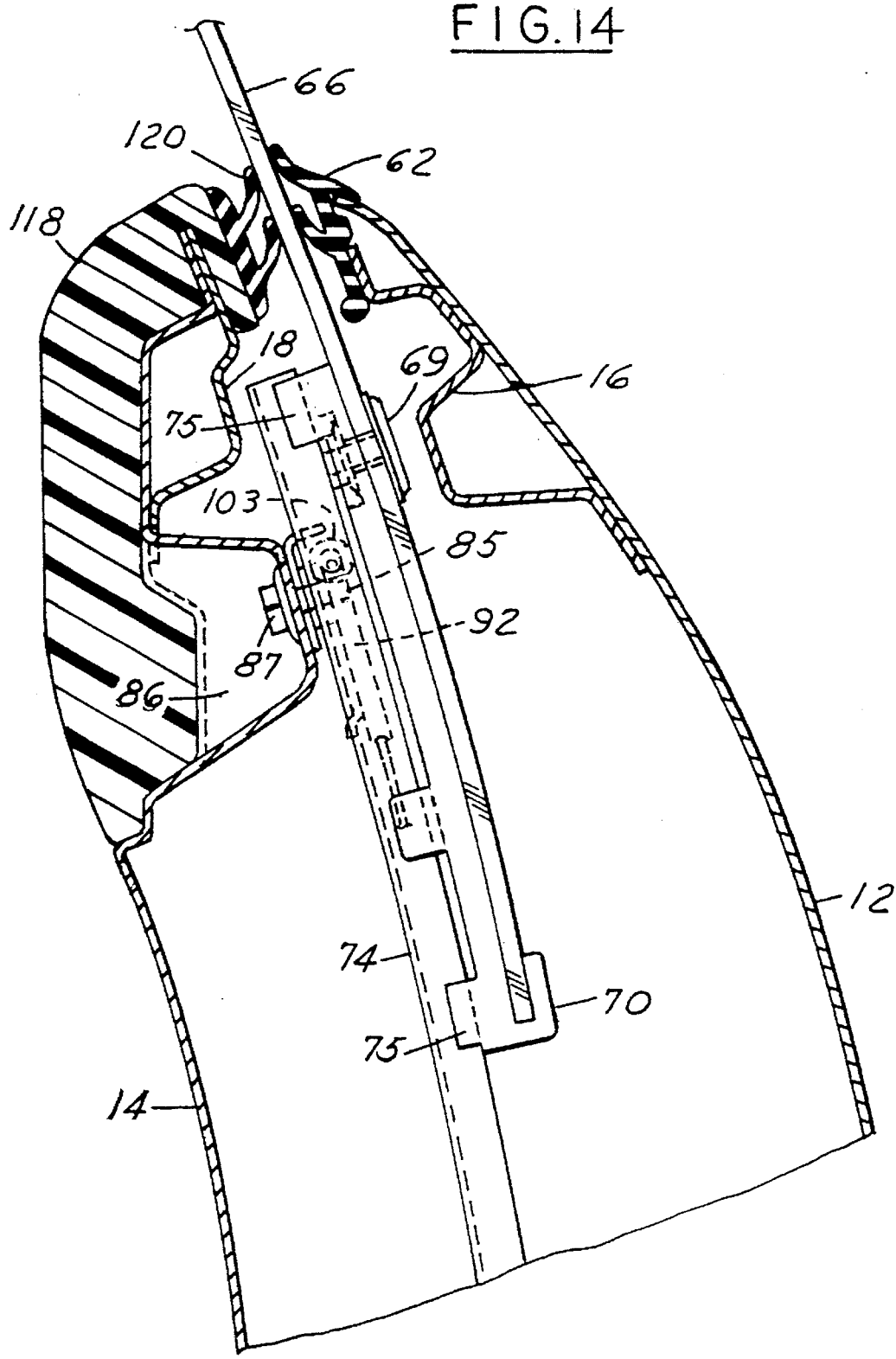
FIG. 14 is an enlarged cross-sectional view taken along the plane of the line 14—14 of FIG. 3, and looking in the direction of the arrows.

A glass and regulator track assembly 64 is adapted to being loaded through the belt-line. The assembly 64 includes a window glass 66 secured at the lower front portion thereof by a fastener 67 to a lift plate 68 (FIGS. 1 and 10), and at the lower rear portion thereof by a fastener 69 to a lift plate 70 (FIGS. 1 and 12). As shown in FIGS. 10 and 12, the lift plates 68 and 70 are slidably mounted in respective vertically oriented tracks 72 and 74 by slide projections 75 shown in FIG. 14. The tracks 72 and 74 are secured by fasteners 76 and 78 at their lower ends in mounting recesses 80 (FIGS. 1 and 11) and 82 (FIGS. 1 and 15) formed in the bottom surface 58 of the inner panel 14. Front and rear upper regulator housings 84 and 85, respectively, are secured at upper front and rear ends of the tracks 72 and 74 in two mounting recesses 86 in the inner panel 14 by fasteners 87 (FIGS. 1 and 14). Front and rear lower regulator housings 88 and 90 are secured at lower front and rear ends of the tracks 72 and 74. Fixed drums 91 (FIG. 10), 92 (FIG. 12), 93 (FIG. 11), and 94 (FIG. 13) are secured in the respective housings 84, 85, 88 and 90.

A crank assembly 96 including a crank arm stem 97, a crank arm 98, and an inner drum 99 (FIG. 10) is secured by fasteners 100 to the inner panel 14 through an opening 101 (FIG. 2). A cable 102 (FIGS. 10–13) extends through a series of sheaths 103 from around the drum 99 of the crank assembly 96 downwardly around the lower front drum 93, upwardly around the upper front drum 91, laterally and downwardly around the lower rear drum 94, upwardly around the upper rear drum 92, and laterally back to the drum 99 of the crank assembly 96 for moving the lift plates 68 and 70 and their associated window 66 up and down by the crank arm 98 (FIGS. 3 and 10).

Figure 8:
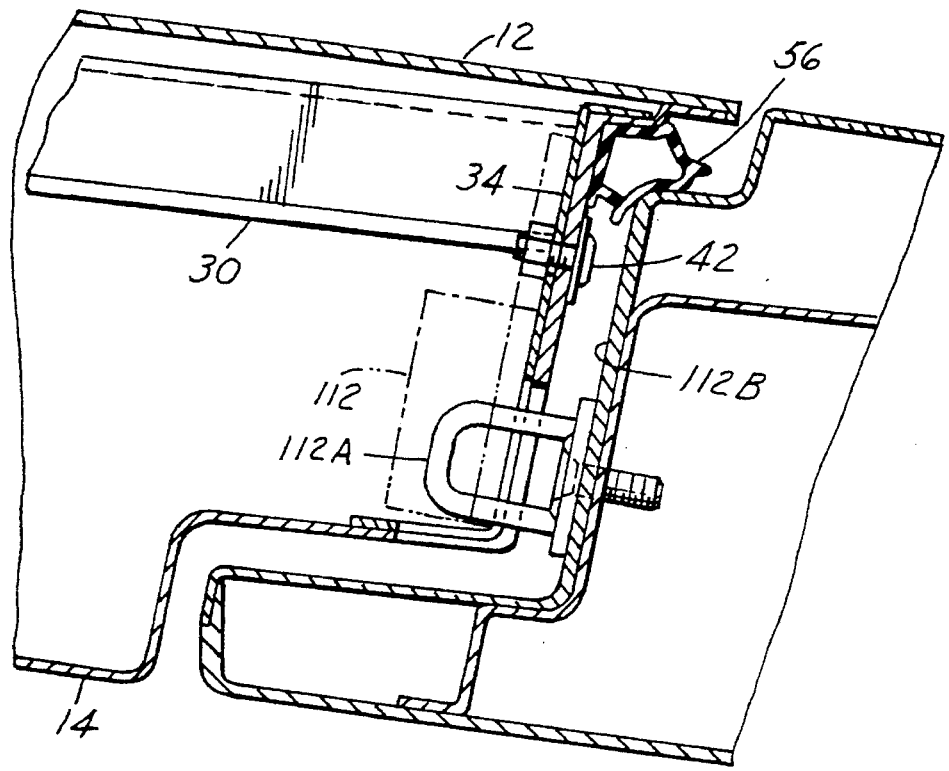
Figure 16:
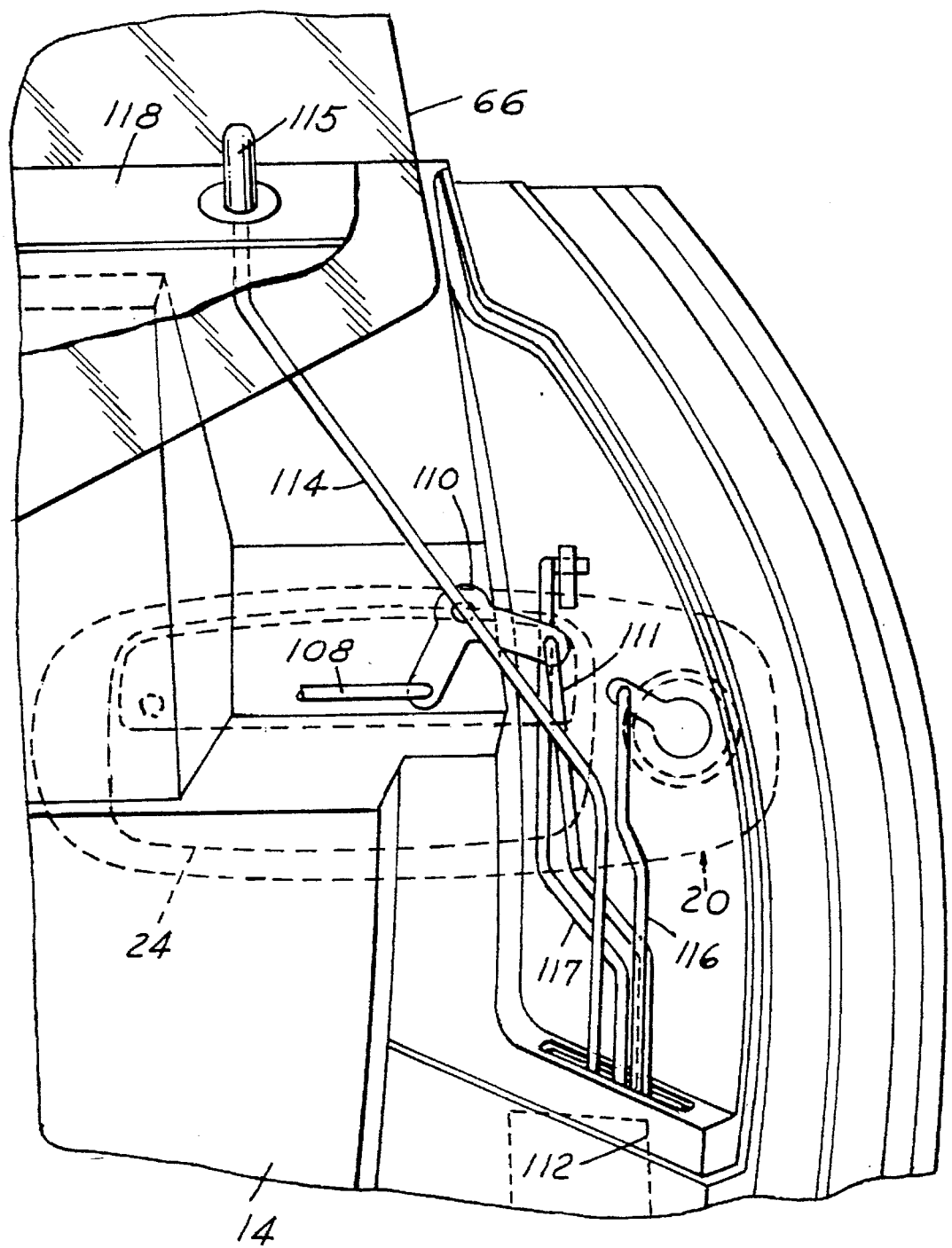

An inside door handle assembly 104 (FIG. 1) is secured by fasteners 106 to the inner panel 14. A rod 108 extends from the assembly 104 to an end of a bell crank 110 which is pivotally mounted at its center to the inner panel 14. The other end of the bell crank 110 is operatively connected via a rod 111 (FIG. 16) to a door latch 112 (FIGS. 1 and 16) secured in an opening 38A formed in the rear end wall 38 by fasteners 113. The latch 112 is operatively connected to a striker 112A (FIG. 8) mounted on a rear vehicle pillar 112B. A further rod 114 extends upwardly to an inside locking push button 115. The outside door handle and lock assembly 20 is operatively connected via a lock rod 116 (FIG. 16) and a handle rod 117 to the door latch 112.

Figure 3:
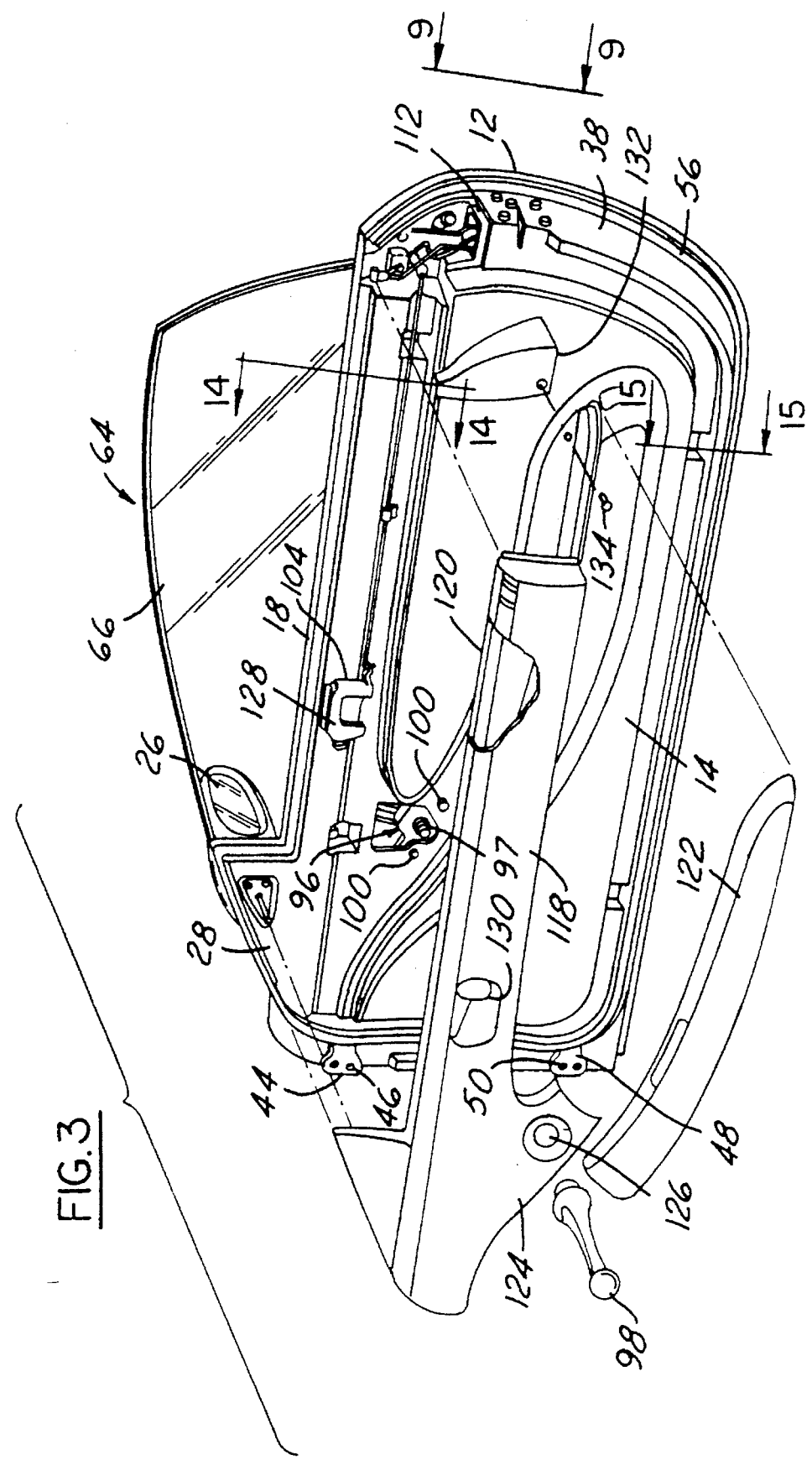
FIG. 3 is a perspective view of the assembled door, with the trim components exploded therefrom.
Figure 4:
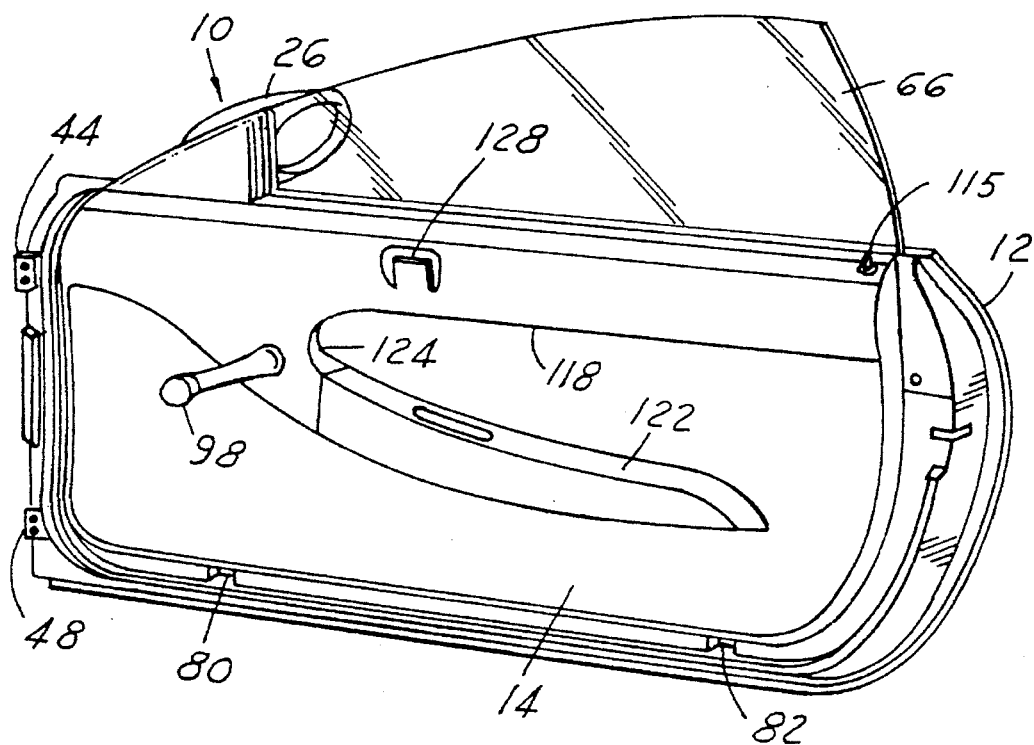
FIG. 4 is a perspective view of the assembled door.

As shown in FIG. 3, a trim member 118, including an inner glass and belt seal assembly 120, is mounted along the length of the upper portion of the inner panel 14 and over the upwardly extending portion 28 of the inner door and belt reinforcement member 18. An armrest assembly 122 (FIGS. 3 and 4) abuts against a front lower portion 124 of the trim member 118, to extend downwardly and rearwardly along a mid portion of the inner panel 14. The crank arm stem 97 extends through an opening 126 (FIG. 3) formed in the front lower trim portion 124. An inside door release handle 128 of the handle assembly 104 extends through a second opening 130 (FIG. 3) formed in the trim panel 118. A latch cover 132 (FIG. 3) is secured by a fastener 134 to the upper rear end wall 38 of the inner panel 14.

Figure 6:
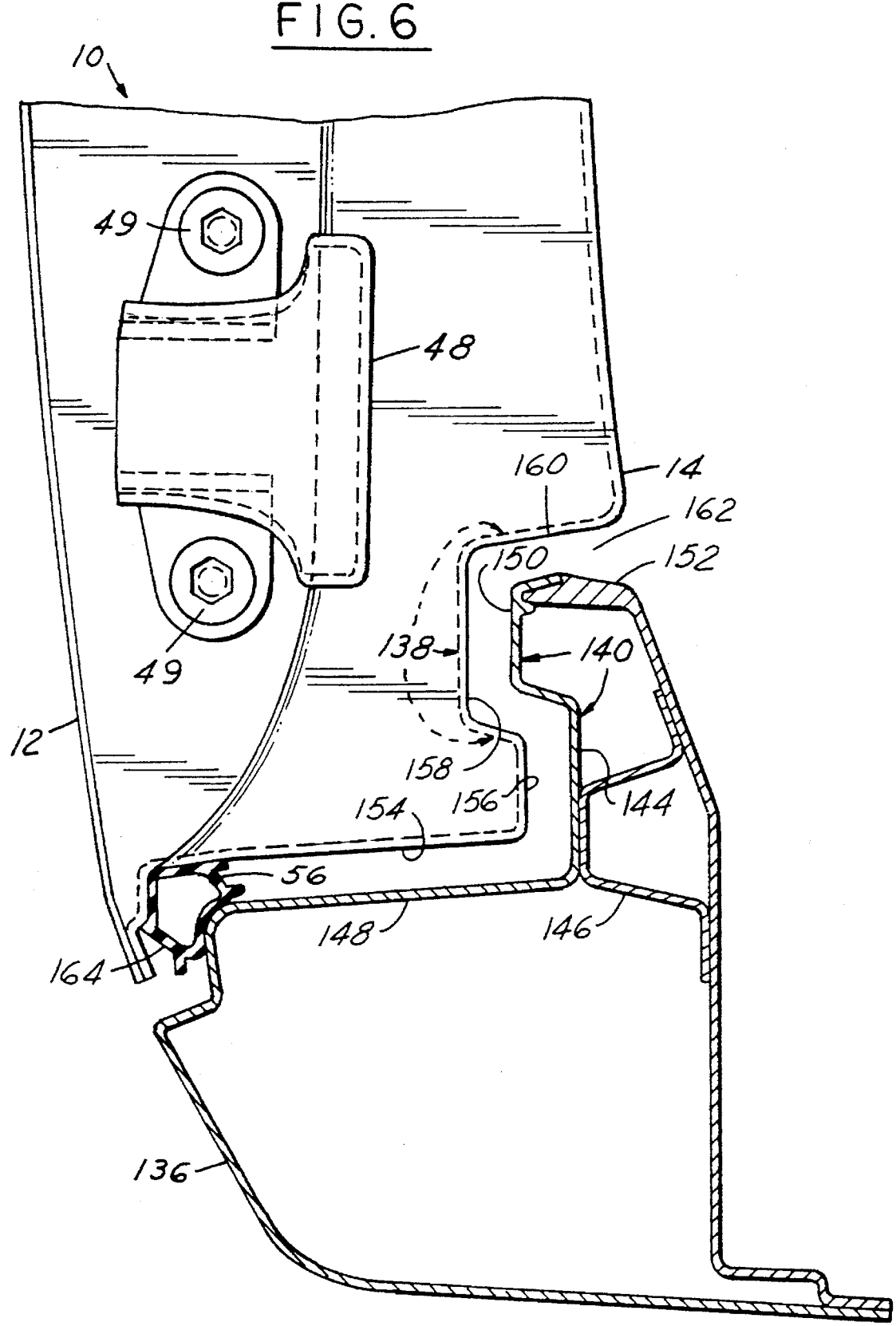
FIG. 6 is a cross-sectional view taken along the plane of the line 6—6 of FIG. 5, and looking in the direction of the arrows.
Figure 7:
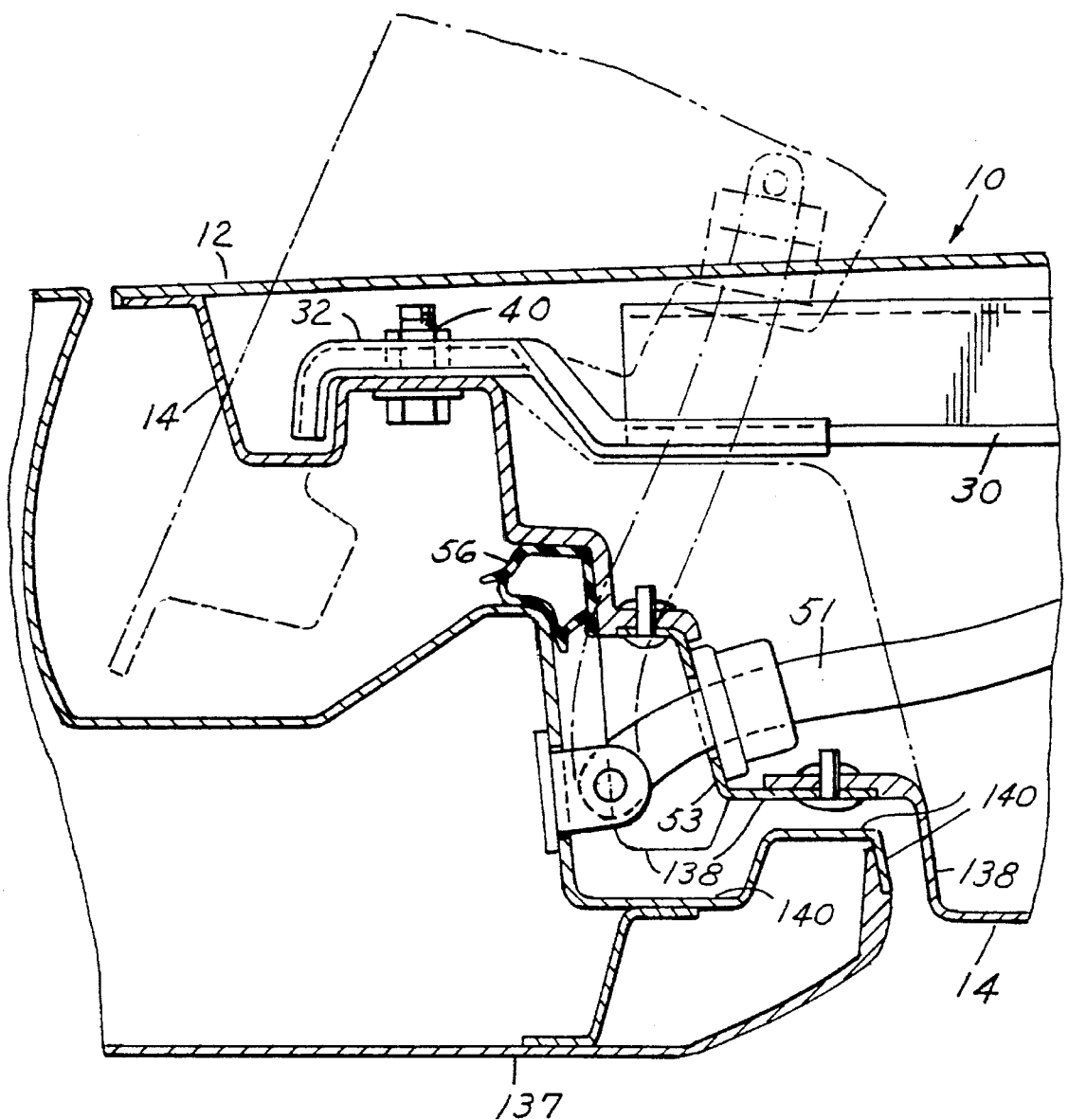
Figure 15:
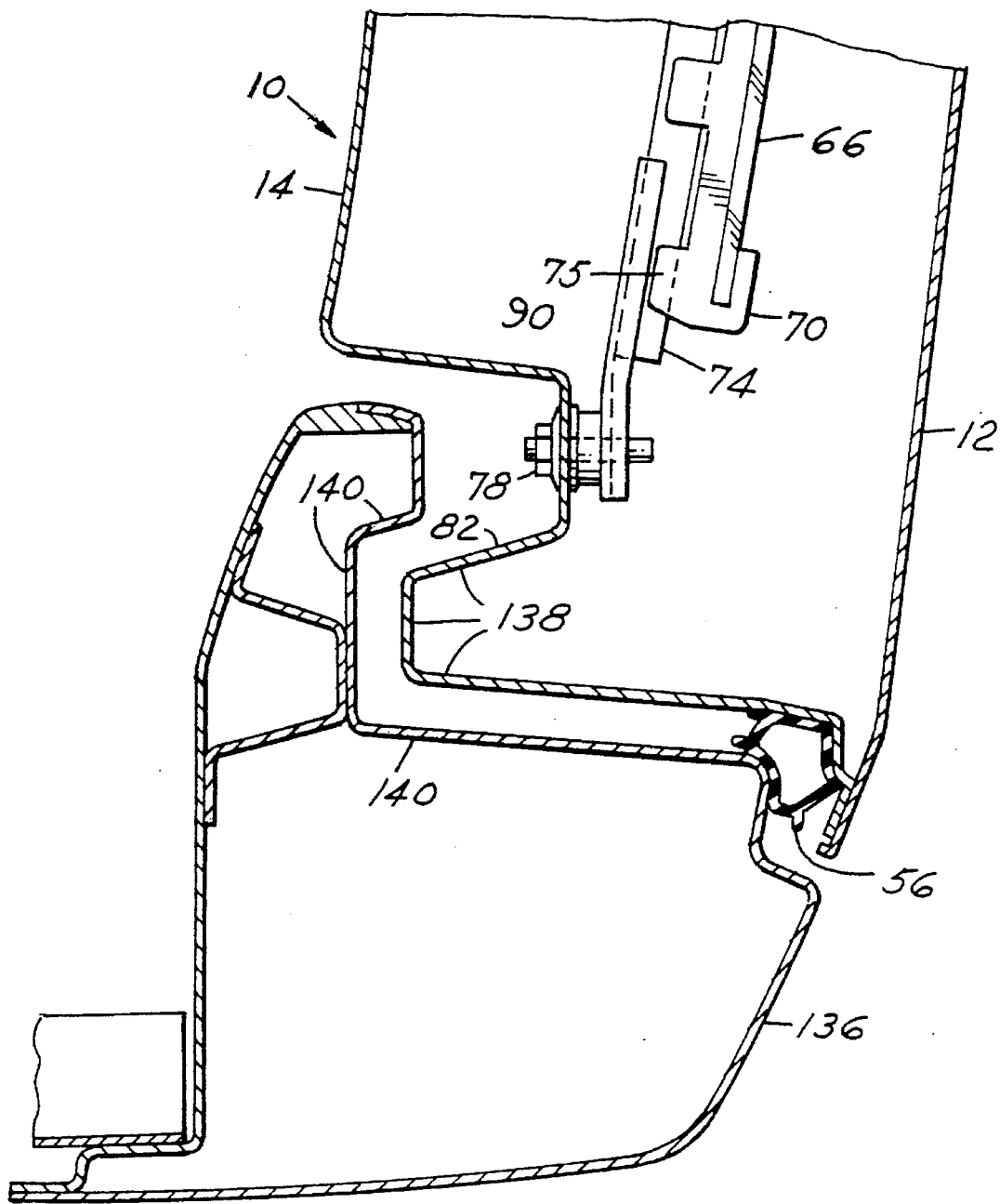
FIG. 15 is an enlarged cross-sectional view taken along the plane of the line 15—15 of FIG. 3, with the glass in its lowermost position, and looking in the direction of the arrows.

As shown in FIGS. 6, 7 and 15, the door assembly 10 is mounted, when closed, above a vehicle rocker panel 136, and on a front pillar 137, with the seal 56 on the bottom of the inner panel 14 confined therebetween. As may be noted in FIGS. 6, 7 and 15, there is illustrated a door-to-body interlock system, represented at oppositely disposed contoured surfaces 138 and 140 formed on the inner door and the body, respectively. Specifically, as shown in FIG. 6, the contoured vehicle body surfaces 140 includes a substantially vertical first wall portion 142, a vertical second wall portion 144 spaced outboard of said first wall portion, a U-spaced brace 146 therebetween, a laterally extending wall portion 148 extending from one end of the vertical second wall portion to the outer vehicle rocker panel 136, and a projection portion 150 formed to extend from the other end of the vertical second wall portion, and a connector portion 152 between distal ends of the projection portion and the substantially vertical first wall portion, and said inner contoured panel includes first, second, third and fourth wall portions 154, 156, 158 and 160, respectively, paralleling said laterally extending wall portion 148, said vertical second wall portion 144, said projection portion 150, and said connector portion 152, respectively, and a predetermined width space 162, therebetween. A seal strip 164 is mounted around the peripheral edges of said first wall portion 154 of the inner contoured panel 14 immediately adjacent the bottom peripheral edge of the outer contoured panel 12, and adapted to abut against said laterally extending wall portion 148 of said contoured vehicle body surfaces 140. As such, in the event of a side impact, this interlock system serves to help prevent the door from moving inwardly into the operator or passenger compartments by locking up the adjacent contoured surfaces.

Industrial Applicability

It should be apparent that the invention provides an improved vehicle door assembly including the following features:

a. all hardware can be loaded from outside the door;

b. the glass and regulator assembly is loaded through the belt opening;

c. less time is required for assembly and service;

d. there is easy access to latch, outside handle, key cylinder and linkage through a latch cover mounted on the inside, rear facing of door inner panel;

e. there is easy access to mirror assembly, inside remote handle, and regulator mounting through the belt-line trim panel;

f. the majority of the door trim surface is molded internally into the door inner panel;

g. a minimal amount of door trim is required, resulting in reduced weight and cost, and less time required for assembly and service; and h. door and body interlocking occur in the event of a side impact.

While but one embodiment of the invention has been shown and described, other modifications thereof are possible within the scope of the following claims.

What is claimed is:

1. A combination of a vehicle and a vehicle door assembly comprising an outer contoured panel, an inner contoured panel, the panels being connected at their bottom peripheral edges, and a contoured vehicle body formed opposite the inner contoured panel, serving as a door-to-body interlock system helping to prevent the door from moving into the inner compartment in the event of a side impact condition, wherein said contoured vehicle body includes a substantially vertical first wall portion, a vertical second wall portion spaced outboard of said first wall portion, a brace therebetween, a laterally extending wall portion extending from one end of the vertical second wall portion to an outer vehicle rocker panel, and a projection portion formed to extend from the other end of the vertical second wall portion, and a connector portion between distal ends of the projection portion and the substantially vertical first wall portion, and said inner contoured panel includes first, second, third and fourth wall portions paralleling said laterally extending wall portion, said vertical second wall portion, said projection portion, and said connector portion, respectively, and a predetermined width space therebetween.

2. The combination of a vehicle and a vehicle door assembly comprising an outer contoured panel, an inner contoured panel, the panels being connected at their bottom peripheral edges, and a contoured vehicle body formed opposite the inner contoured panel, serving as a door-to-body interlock system helping to prevent the door from moving into the inner compartment in the event of a side impact condition, wherein said contoured vehicle body includes a substantially vertical first wall portion, a vertical second wall portion spaced outboard of said first wall portion, a brace therebetween, a laterally extending wall portion extending from one end of the vertical second wall portion to an outer vehicle rocker panel, and a projection portion formed to extend from the other end of the vertical second wall portion, and a connector portion between distal ends of the projection portion and the substantially vertical first wall portion, and said inner contoured panel includes first, second, third and fourth wall portions paralleling said laterally extending wall portion, said vertical second wall portion, said projection portion, and said connector portion, respectively, and a predetermined width space therebetween, and a seal strip mounted around the peripheral edges of said first wall portion of the inner contoured panel, and adapted to abut against said laterally extending wall portion of said contoured vehicle body.

* * * * *